UNITED STATES PATENT OFFICE.

JAMES CODDINGTON AND ISAAC CODDINGTON, OF NEW YORK, N. Y.

IMPROVEMENT IN MEDICAL COMPOUNDS OR CAPSICUM PLASTERS.

Specification forming part of Letters Patent No. 125,173, dated April 2, 1872.

SPECIFICATION.

*To all whom it may concern:*

Be it known that we, JAMES CODDINGTON and ISAAC CODDINGTON, composing the firm of J. & I. CODDINGTON, of the city, county, and State of New York, have invented a new Combination of the Extract of the African Capsicum with the *Emplastrum Resinæ* of the United States Pharmacopœia, thus forming a plaster to be used for local and rheumatic pains; and we hereby declare that the following is a full and correct description thereof.

The nature of our invention consists in incorporating a strong alcoholic or ethereal extract of the African capsicum with the *emplastrum resinæ* of the Pharmacopœia of the United States.

To enable others skilled in the art to make and use the same, we will proceed to describe the process of manufacture.

We either spread the extract of capsicum on the surface of muslin or linen previously spread with the *emplastrum resinæ*—that is, on what is commonly known as adhesive plaster—or we mix the extract of capsicum with the *emplastrum resinæ* and spread the mixture thus formed on the surface of muslin or linen.

This mixing and spreading can be done either by hand or by any of the machines now existing and used for that and like purposes.

What we claim as our invention, and desire to secure by Letters Patent, is—

1. The incorporation of the extract of capsicum before mentioned with the *emplastrum resinæ* of the Pharmacopœia, thus forming a mixture to be spread on muslin or linen, and used as a plaster for local and rheumatic pains, or any other purpose to which it may be applicable.

2. A new article of manufacture, a "capsicum plaster," made substantially as herein described.

JAMES CODDINGTON.
ISAAC CODDINGTON.

Witnesses:
JNO. D. PATTEN,
J. C. WILDMAN.